United States Patent
Billups et al.

(10) Patent No.: US 6,409,621 B1
(45) Date of Patent: Jun. 25, 2002

(54) POWER TRANSMISSION BELT

(75) Inventors: Wesley James Billups; Dennis Dean Kottwitz; Jeffery Dwight Lofgren; Matthew Thomas Morris, all of Lincoln, NE (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 09/569,996

(22) Filed: May 12, 2000

(51) Int. Cl.$^7$ ............................... F16G 1/00; F16G 5/00
(52) U.S. Cl. ........................................ 474/263; 474/260
(58) Field of Search ................................. 474/191, 260, 474/261–265, 205, 267, 271, 268, 237; 524/395, 427; 427/27, 180, 216; 428/223, 192, 290, 292; 525/105–109

(56) References Cited

U.S. PATENT DOCUMENTS

| | | | |
|---|---|---|---|
| 4,209,550 A | * 6/1980 | Hagenbach et al. | 427/27 |
| 4,246,055 A | 1/1981 | Henderson | 156/138 |
| 4,267,226 A | * 5/1981 | Kohler et al. | 474/253 X |
| 4,392,842 A | 7/1983 | Skura et al. | 474/205 |
| 4,690,664 A | * 9/1987 | Wetzel | 474/205 |
| 4,952,293 A | 8/1990 | Sypula et al. | 204/180.7 |
| 5,209,705 A | 5/1993 | Gregg | 474/204 |
| 5,417,618 A | * 5/1995 | Osako et al. | 474/205 |
| 5,421,789 A | 6/1995 | Gregg | 474/153 |
| 5,584,771 A | * 12/1996 | Isshiki et al. | 474/264 |
| 5,610,217 A | * 3/1997 | Yarnell | 474/264 X |
| 5,860,883 A | 1/1999 | Jonen et al. | 474/205 |

FOREIGN PATENT DOCUMENTS

| | | |
|---|---|---|
| EP | 0452488 | 10/1991 |
| EP | 0662571 | 12/1994 |
| EP | 0961050 | 12/1999 |
| EP | 1035353 | * 9/2000 |
| GB | 1404250 | * 8/1975 |
| GB | 2349113 | 10/2000 |
| JP | 42976 | * 2/1988 |
| JP | 63188 | * 3/1994 |
| JP | 184807 | * 7/1998 |
| JP | 267087 | * 10/1998 |

OTHER PUBLICATIONS

Kynar® and Kynar Flex® PVDF Technical Brochure, Elf Atochem North American, Inc., Tehnical Polymers, 2000 Market Street, Philadelphia, PA 19103.

* cited by examiner

Primary Examiner—David A. Bucci
Assistant Examiner—Marcus Charles
(74) Attorney, Agent, or Firm—Bruce J. Hendricks

(57) ABSTRACT

An endless power transmission belt comprising a tension section, a cushion section and a load-carrying section disposed between the tension and the cushion sections, and at least one drive surface having fabric layer bonded to an outer surface of the belt is coated with a layer of polyvinylidene fluoride.

9 Claims, 1 Drawing Sheet

POWER TRANSMISSION BELT

BACKGROUND OF THE INVENTION

Recent developments in the automotive industry have resulted in higher engine output in a more compact engine compartment. As a result, power transmission belts on these engines have been required to operate under high load, at high tensions and at high temperatures while reducing belt width. This environment demands a high quality belt capable of withstanding these severe conditions. One method to improve the properties of such belts has been to improve the materials from which the belts are made of For example, conventional polychloroprene rubber has been replaced with hydrogenated nitrile rubber and chlorosulfonated polyethylene. In addition, solid lubricants have been added to the rubber compositions to improve the abrasion properties of the belt by reducing the coefficient of friction.

SUMMARY OF THE INVENTION

The present invention relates to a power transmission belt that is characterized by a fabric coating of polyvinylidene fluoride on the drive surface which reduces the coefficient of friction and minimizes wear.

BRIEF DESCRIPTION OF THE FIGURES

The accompanying figures show embodiments of this invention in which.

BRIEF DESCRIPTION OF THE INVENTION

Figure 1:
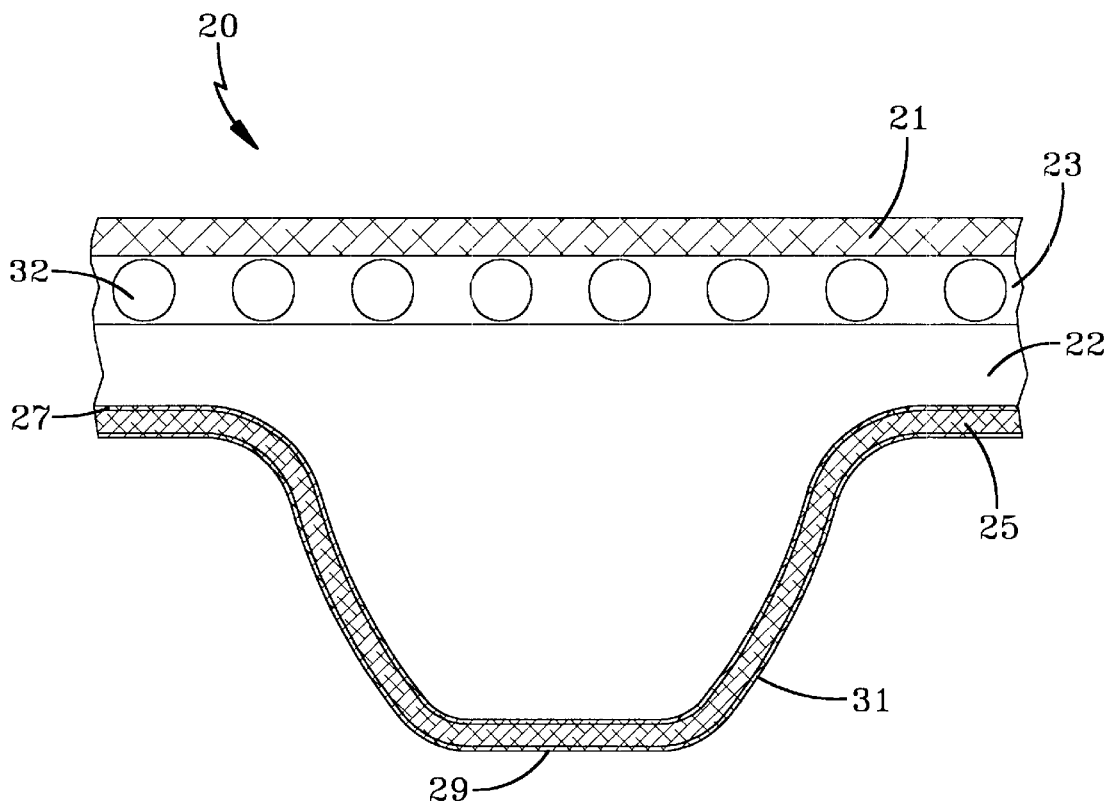
FIG. 1 is a fragmentary perspective view illustrating one embodiment of an endless power transmission belt of this invention.

There is disclosed an endless power transmission belt comprising
  (a) a tension section;
  (b) a cushion section;
  (c) a load-carrying section disposed between said tension section and cushion section; and
  (d) at least one drive surface having a fabric layer bonded to an outer surface of the belt, the improvement comprising a coating layer of polyvinylidene fluoride.

Reference is now made to FIG. 1 of the drawing which illustrates an endless power transmission belt structure or belt of this invention which is designated generally by the reference numeral 20. The belt 20 is particularly adapted to be used in associated sheaves in accordance with techniques known in the art. The belt is particularly suited for use in automotive applications. The belt 20 is adapted to be used in so-called torque sensing drives, application where shock loads of varying belt tension are imposed on the belt, applications where the belt is operated at variable speeds, applications where the belt is spring-loaded to control its tension and the like.

The belt 20 comprises a tension section or backing 21, a cushion section 22 and a load-carrying section 23 disposed between the tension section 21 and cushion section 22. The belt 20 also has a fabric layer 25 adhered to drive surface 29. The belt may have a barrier layer 27 which is located between the cushion section 22 and the fabric layer 25 to prevent or decrease the amount of rubber with cushion section 22 permeating though the fabric 25 to the drive surface 29.

In the belts of the present invention, there is at least one drive surface 29 having a fabric layer 25 bonded to the outer surface. In the embodiment shown in FIG. 1, there is one drive surface 29 having a fabric layer 25. In accordance with other embodiments, the belt 20 may have multiple drive surfaces of two or more. The fabric layer may also be on the outer surface of the belt which is not a drive surface.

The fabric layer 25 may be made from a woven, non-woven or knitted fabric. The fabrics for use in the present invention are made of conventional materials including nylon (such as nylon 4,6, nylon 6,6 and nylon 6), cotton, polyester, cotton/polyester, nylon/polyester, cotton/nylon, Lycra™ (segmented polyurethane), aramid, rayon and the like. Preferably, the fabric is made of nylon 6,6.

As described later, a layer of polyvinylidene fluoride 31 is applied to the fabric layer 25 of the drive surface 29.

The load-carrying section 23 has load-carrying means in the form of load-carrying cords 32 or filaments which are suitably embedded in an elastomeric load-carrying section 23 in accordance with techniques which are well known in the art. The cords may be transverse or parallel to the length of the belt. The cords 32 or filaments may be made of any suitable material known and used in the art. Representative examples of such materials include aramids, fiberglass, nylon, polyester, cotton, steel, carbon fiber and polybenzoxazole.

The drive surface 29 of the belt 20 of FIG. 1 is synchronous. In accordance with other embodiments and as discussed later, it is contemplated herein the belts of the present invention also include those belts where the drive surface of the belt may be smooth, single V-grooved, and multi-V-grooved. Representative examples of synchronous include belts having trapezoidal or curvilinear teeth. The tooth design may have a helical offset tooth design such as shown in U.S. Pat. Nos. 5,209,705 and 5,421,789.

The rubber compositions for use in the tension section 21, cushion section 22 and load-carrying section 23 may be the same or different. Conventional elastomers which may be used in one or both of these sections include natural rubber, polychloroprene, acrylonitrile-butadiene copolymers (NBR), polyisoprene, zinc salts of unsaturated carboxylic acid ester grafted hydrogenated nitrile butadiene elastomers, styrene-butadiene rubbers, polybutadiene, EPDM, hydrogenated acrylonitrile-butadiene copolymers (HNBR), polyurethane, elastomers marketed under the Viton™ designation and ethylene-acrylic elastomers sold under the name VAMAC and blends thereof.

The elastomers for use in the tension section 21, cushion section 22 and load carrying section 23 may be crosslinked by various peroxide containing curing agents. Curing agents which may be employed in the compositions of the invention include, for example, di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di(benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate and n-butyl-4,4-bis(t-butyl peroxy) valerate. Additional curing agents which may be employed include diacyl or dialkyl peroxides such as α,α'-bis(t-butylperoxy)-isopropylbenzene, 2,5-dimethyl-2,5-di(t-butylperoxy) hexane, di-t-butyl peroxide, 2,5-dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di (benzoylperoxy)-hexane and benzoyl peroxide. All of the above curing agents are commercially available.

The amount of curing agent that is used may vary. Generally speaking, the level will range of from 0.1 to 10 phr (based on active parts of peroxide). Preferably, the level ranges from 1.8 to 3.0 phr.

In the belt of FIG. 1, there is one drive surface 29 having a fabric layer 25 bonded to the outer surface. Onto the fabric layer 25 is the layer of polyvinylidene fluoride 31. The polyvinylidene fluoride layer may be the homopolymer of vinylidene fluoride or a copolymer of vinylidene fluoride and another monomer. One or more monomers selected from the group consisting of tetrafluoroethylene, hexafluoropropylene, monochlorotrifluoroethylene, vinyl fluoride, perfluorovinylalkyl ethers, vinyl acetate and ethylene can be used for copolymerization with vinylidene fluoride.

The polyvinylidene fluoride layer is preferably applied in the form of a film. The film is generally transparent and may be an unoriented film produced by the techniques of extrusion or casting or an oriented film obtained by stretching the unoriented film.

Commercially available films of polyvinylidene fluoride may be used to construct the belts of the present invention. Such films include those that are commercially available from Westlake Plastics Company of Lenni, Pa.

The thickness of the polyvinylidene fluoride layer may vary. Generally speaking, the thickness may range from 0.0125 mm (0.5 mil) to 1.25 mm (50 mils). Preferably, the thickness ranges from 0.05 mm (2 mils) to 0.20 mm (8 mils).

The polyvinylidene fluoride layer 31 may be applied to the fabric and heated to adhere the polyvinylidene fluoride to the fabric. Preferably, this is done prior to application of the fabric to the cushion section 22 during construction of the belt 20.

Optionally, solid inorganic lubricants may be present in the polyvinylidene fluoride coating composition. Representative examples of such lubricants include molybdenum disulfide, molybdenum diselenide, graphite, antimony trioxide, tungsten disulfide, talc, mica, tungsten diselenide and mixtures thereof. A preferred lubricant includes graphite. The amount of such solid inorganic lubricants, if used, will generally range from 1 to 25 parts by weight per 100 parts by weight of polyvinylidene fluoride.

As mentioned above, the belt 20 may optionally have a barrier layer 27 located between the cushion stock 22 and fabric 25. A preferred composition for use as a barrier layer 27 on the fabric of the drive surface contains a zinc salt unsaturated carboxylic acid ester grated hydrogenated nitrite butadiene elastomer (ZnHNBR). The zinc salt carboxylic acid ester grafted hydrogenated nitrite butadiene elastomers sold by Zeon Chemicals, Inc., Rolling Meadows, Ill., under any of the following product designation: ZSC 1295, ZSC 2095, ZSC 2195, ZSC 2295, ZSC 2295L, ZSC 2295R and ZSC 2395; most preferably, ZSC 2295 having a Mooney viscosity of about 88, about 10 percent unsaturation and an acrylonitrile content of about 36 percent and ZSC 2295L having a Mooney viscosity of about 70, about 10 percent unsaturation and an acrylonitrile content of about 36 percent. The barrier layer 27 may range in thickness of from 0.025 mm (1.0 mils) to 0.38 mm (15 mils). The barrier layer 27 may be applied in a number of means. For example, calendering onto the fabric calendering onto a transfer media and thereafter thermally transferring onto the fabric, solvating and spreading or spraying onto the fabric or transfer media.

The power transmission belts may be built on a drum device. The belt may be constructed directly as a mold or the backing may be first applied and the belt assembled in reverse order. For example, the backing may be initially applied to the drum. Next, the tension section is applied as a sheet followed by spirally onto the poly drum the cord or tensile member (load carrying section). Thereafter, the cushion section is applied onto the tension section. Separately, the polyvinylidene fluoride film may be heat bonded to the facing fabric and thereafter laminated onto the cushion section. Another alternative is to apply the polyvinylidene film and facing fabric separately relying on the heat during cure to mechanically bond the two layers. The assembled laminate or slab is then placed in a mold, cured and cut into the belts in a manner known to those skilled in the art.

EXAMPLE

Both the control belts and the belts of the present invention were prepared in the same manner and were of the same construction and materials, except as noted below. A cotton/polyester fabric backing was first applied to a drum device followed by the application of a nylon 6,6 fabric. Both of these fabrics, which made up the tension section, had a hydrogenated NBR treatment. Thereafter, fiberglass cord dipped in an adhesive was spiraled onto the drum. A rubber sheet of hydrogenated NBR was applied onto the cord to form the cushion section. Separately, the fabric for use in the control belts was a resorcinal formaldehyde latex dipped nylon 6,6 knit fabric that was laminated with 0.1 mm of a high density polyethylene film. The belts of the present invention used the same dipped fabric except the fabric was laminated with 0.125 mm of a polyvinylidene fluoride film obtained from Westlake Plastics Company. Both films were laminated to the facing fabric in a flat platen press at 191° C. Each fabric was then applied to the drum and each laminate was cured in the same mold and cut to form 8 mm pitch, 25 mm wide, 150 tooth helically offset positive drive belts.

Belts of each construction were tested. The belts constructed with the polyvinylidene fluoride layer on the drive surface had improved high temperature belt life and reduced noise generation over the belts using high density polyethylene. Based on dynamic life testing, belts with the polyvinylidene fluoride withstood temperatures of up to 135° C. without a reduction in life while the control belts had a significant reduction in life at 88° C. The belts with the high density polyethylene layer had a noise level of 70 decibels whereas the belt of the present invention had a noise level of 82 decibels, or an improvement of 12 decibels.

While certain representative embodiments and details have been shown for the purpose of illustrating the invention, it will be apparent to those skilled in this art that various changes and modifications may be made therein without departing from the spirit or scope of the invention.

What is claimed is:

1. An endless power transmission belt comprising
   (a) a tension section;
   (b) a cushion section;
   (c) a load-carrying section disposed between said tension section and cushion section; and
   (d) at least one drive surface having a fabric layer bonded to an outer surface of the belt, the improvement comprising a coating layer of polyvinylidene fluoride is adhered onto the surface of the fabric layer and the polyvinylidene fluoride is selected from the group consisting of a homopolymer of vinylidene fluoride and copolymers of vinylidene fluoride and another monomer which is selected from the group consisting of tetrafluoroethylene, hexafluoropropylene, monochlorotrifluoroethylene, vinyl fluoride, perfluorovinylalkyl ethers, vinyl acetate and ethylene.

2. The power transmission belt of claim 1 wherein the coating layer of polyvinylidene fluoride ranges from 0.0125 mm to 1.25 mm thick.

3. The power transmission belt of claim 2 wherein the polyvinylidene fluoride contains graphite.

4. The power transmission belt of claim 1 wherein the fabric layer is selected from the group consisting of woven, non-woven and knitted fabrics.

5. The power transmission belt of claim 1 wherein a peroxide containing curing agent is present.

6. The power transmission belt of claim 5 wherein said peroxide containing curing agent is selected from the group consisting of di-tertbutyl peroxide, dicumyl peroxide, benzoyl peroxide, 2,4-dichlorobenzol peroxide, t-butyl-cumyl peroxide, t-butyl perbenzoate, t-butyl peroxide, t-butylperoxy (2-ethyl hexanoate), 2,5-dimethyl-2,5-di (benzoylperoxy)-hexane, benzoyl peroxide, 2,5-dimethyl-2,5-(t-butyl peroxy)-hexane, 1,1-ditert-butyl peroxy-3,3,5-trimethyl cyclohexane, 4,4-ditert-butyl peroxy n-butyl valerate, n-butyl-4,4-bis (t-butyl peroxy) valerate, α,α-bis (t-butylperoxy)-isopropylbenzene, 2,5-dimethyl-2,5-di(5-butylperoxy) hexane, di-t-butyl peroxide, 2,5-dimethyl-2,5-di-(t-butylperoxy)hexyne-3, lauroyl peroxide, t-butyl hydroperoxide, t-amyl hydroperoxide, cumene hydroperoxide, t-butyl perbenzoate, t-butyl peroxide, t-butylperoxy (2-ethyl hexanoate), 2,5-dimethyl-2,5-di (benzoylperoxy)-hexane, benzoyl peroxide and mixtures thereof.

7. The power transmission belt of claim 1 having one driving surface.

8. The power transmission belt of claim 1 wherein a barrier layer is located between the cushion section and the fabric layer bonded to the outer surface of the belt.

9. The power transmission belt of claim 8 wherein said barrier layer contains a zinc salt unsaturated carboxylic acid ester grafted hydrogenated nitrile butadiene elastomer.

* * * * *

UNITED STATES PATENT AND TRADEMARK OFFICE
CERTIFICATE OF CORRECTION

PATENT NO.    : 6,409,621 B1
DATED         : June 25, 2002
INVENTOR(S)   : Wesley James Billups et al.

It is certified that error appears in the above-identified patent and that said Letters Patent is hereby corrected as shown below:

Column 4,
Line 42, delete "70" and substitute -- 82 -- therefor.
Line 44, delete "82" and substitute -- 70 -- therefor.

Signed and Sealed this

Twenty-ninth Day of October, 2002

*Attest:*

*Attesting Officer*

JAMES E. ROGAN
*Director of the United States Patent and Trademark Office*